2 Sheets—Sheet 1.
W. WESTLAKE.
Locomotive Head-Light.
No. 9,186. Reissued May 4, 1880.
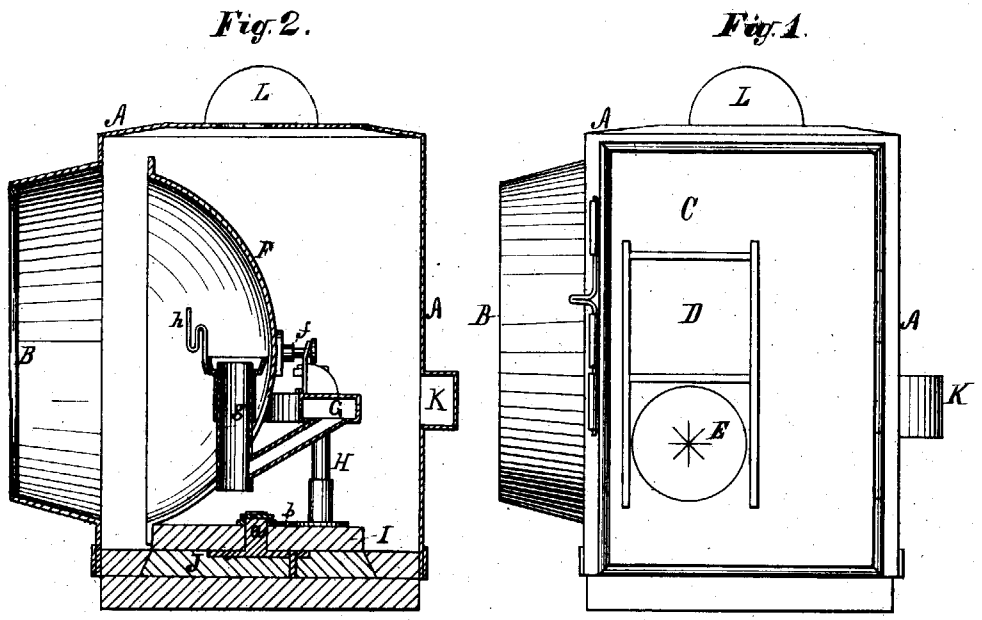
*Witnesses:*
Henry Eichling
Robt. N. Duncan
*Inventor:*
William Westlake
by Saml A. Duncan Atty 2 Sheets—Sheet 2.

W. WESTLAKE.

Locomotive Head-Light.

No. 9,186. Reissued May 4, 1880.

*Witnesses:*
Henry Eichling
Robt. H. Duncan

*Inventor:*
William Westlake
by Paul A. Duncan atty.

UNITED STATES PATENT OFFICE.

WILLIAM WESTLAKE, OF BROOKLYN, NEW YORK.

LOCOMOTIVE HEAD-LIGHT.

SPECIFICATION forming part of Reissued Letters Patent No. 9,186, dated May 4, 1880.

Original No. 143,550, dated October 7, 1873. Application for reissue filed March 4, 1880.

*To all whom it may concern:*

Be it known that I, WILLIAM WESTLAKE, of the city of Brooklyn, in the county of Kings and State of New York, have invented a new and useful Improvement in Locomotive Head-Lights, of which the following is a full, clear, and exact description, reference being had to the accompanying drawings, in which—

Figure 3:
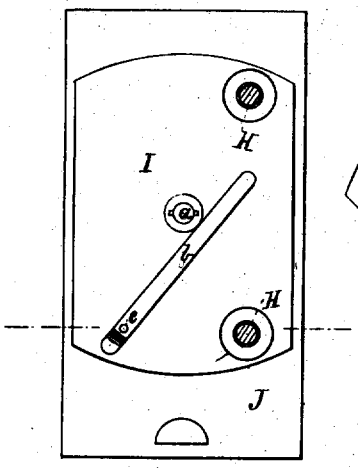
Figure 4:
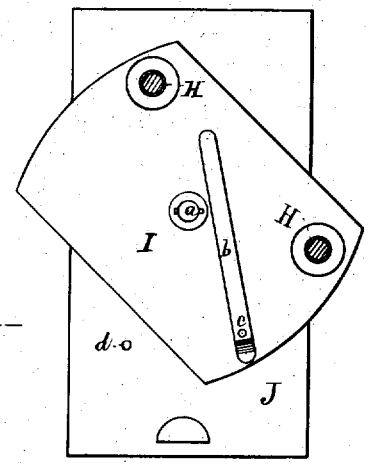
Figure 5:
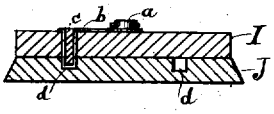

Figure 1 is a side elevation of a locomotive head-light containing my improvement; Fig. 2, a vertical cross-section of the same; Fig. 3, a plan view of the revolving platform and sliding base, the lamp and reflector being removed; Fig. 4, a similar view of the same parts, with the platform turned to bring the reflector and lamp into a convenient position for lighting, and Fig. 5 a cross-section on the line *x x* of Fig. 3.

Prior to the present invention locomotive head-lights have been constructed and arranged so that the entire case in which the lamp and the reflector were inclosed could be turned to the right or left for the purpose of keeping the light on the track when the locomotive is passing round curves; but, so far as known, there was no construction by which the lamp and its reflector could be partially or wholly turned or revolved independently of the inclosing-case. The usual construction has been to mount the lamp and its reflector upon a sliding base, which was pushed into position in ways in the bottom of the case and retained in such position until it was withdrawn. There was no means provided by which the reflector while in the case could be adjusted to face otherwise than directly to the front. It followed from this construction that when it was desired to reach the lamp to light it, or to reach the face of the reflector for any purpose, it was necessary to withdraw the lamp and the reflector either partially or wholly through the side door of the case, and then to push them back to their proper position.

The object of the present invention is to provide means by which the lamp and the reflector of locomotive head-lights can be more conveniently reached; and the improvement consists in arranging the lamp and its reflector so that they can be turned or revolved within the case; a lamp and its reflector, in combination with a platform arranged to revolve within the case of a locomotive head-light; a revolving lamp and reflector, in combination with an aperture or arm-hole in the inclosing-case, and an aperture or arm-hole in the case of a locomotive head-light provided with an elastic covering.

A represents the case of a head-light; B, the window in front of the case for the transmission of the light; C, the side door, provided with the usual hinges and fastening; D, a slide for closing the aperture or arm-hole in the door C; E, an elastic yielding covering for the arm-hole; F, reflector; G, oil-reservoir; H, supports for oil-reservoir; I, revolving platform, upon which the lamp and reflector are mounted; J, sliding base-plate; K, covered recess to permit the turning of the oil-reservoir when the case is not otherwise sufficiently large; *a*, pivot upon which the platform I turns; *b*, spring or spring-bar; *c*, catch-pin; *d*, holes in base-plate J for locking or holding the platform I; *f*, point of attachment of the reflector; *g*, burner connected with tube to oil-reservoir, and *h* a wire or hook at the side of the burner for holding the chimney while lighting the lamp.

The case A and window B may be made in the usual form and of any suitable material. The recess K may be omitted whenever the case is of sufficient capacity to permit the lamp and its attachments to revolve; but in applying this invention to old lamps, whose reservoirs projected rearward to a considerable extent, it will oftentimes be found necessary to make the case wider or deeper, and the attachment of this recess K is a convenient way of accomplishing it.

L is a wind-break placed on the top of the case A, over or around the smoke-passages.

The reflector, oil-reservoir, and burner may be arranged to operate in the usual way. The revolving platform I is pivoted at *a* to the base-plate J, and may be arranged to turn or revolve to such an extent as to bring the lamp and reflector to the required position. When turned to the position shown in Fig. 4 of the drawings, the arm inserted through the arm-hole in the door C can pass the edge of the reflector, and the lamp can be easily reached for the purpose of lighting it, and the operator, by looking through the window in front, can direct the movements of his hand in lighting or adjusting the lamp.

It will be observed that when the reflector is turned to face toward or to the rearward of the door C the wall of the reflector will be interposed between the lamp and the window B, and the transmission of the light through the window will be prevented. This convenient adjustment may be availed of whenever it is desired to conceal from the directors of other trains the presence of a locomotive or train at any special spot, as is often the case; and it may also be employed with advantage to bring the reflector or burner into the position where they can be readily cleaned through the open door C, thus saving the necessity of wholly or partially withdrawing the reflector and lamp from their inclosing-case.

The spring *b*, provided with catch *c*, to take into holes *d* properly located in the base-plate J, furnishes convenient means for locking the revolving platform in the desired positions.

For the purpose of adjusting the height of the wick without turning the lamp and its attachments into position, a wick-regulator may be placed inside of the reflector, and it will be found convenient to provide a match-safe and rough surface for lighting matches inside of the case A, near the arm-hole.

The covering or diaphragm E for the arm-hole is made of india-rubber provided with slits, as shown, so as to permit the passage of the hand and arm through it, and so that it will fit against the arm and prevent the ingress of wind when lighting the lamp. It may, however, be made in folds, which will spread apart and return like the folds of a bellows, or in such other manner as will permit the insertion of the hand and arm without admitting wind.

The base-plate J, to which the revolving platform I is pivoted, may be made to slide in ways constructed in the bottom of the case, by which means the lamp and reflector can be easily introduced into and withdrawn from the case, and by which they can be fixed in their proper position when in the case.

What is claimed as new is—

1. In a locomotive head-light, the combination of a reflector and a revolving support, whereby a partial or complete revolution can be given to the reflector independently of the inclosing-case.

2. The combination, in a locomotive head-light, of a revolving platform with a lamp and its reflector mounted on such platform, substantially as and for the purpose described.

3. The combination, in a locomotive head-light, of a revolving lamp and its reflector with an aperture or arm-hole in the inclosing-case, substantially as and for the purpose described.

4. In the case of a locomotive head-light, an arm-hole or aperture, in combination with an elastic covering, substantially as and for the purpose set forth.

WILLIAM WESTLAKE.

Witnesses:
ROBERT H. DUNCAN,
JAMES S. GREVES.